No. 700,966. Patented May 27, 1902.
C. MOEHRING & W. FETZER.
SEEDER.
(Application filed Dec. 9, 1901.)
(No Model.)
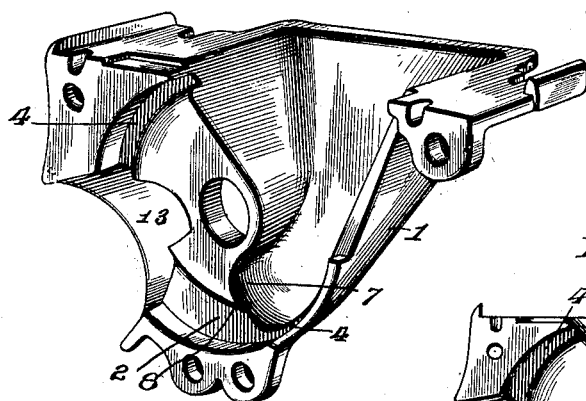
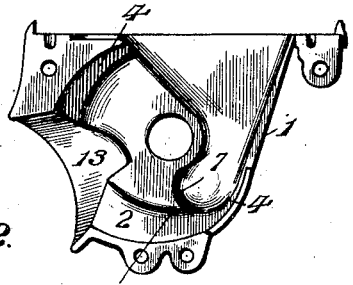
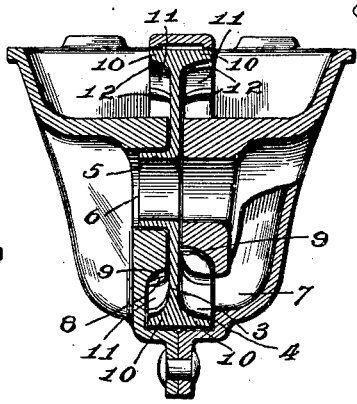
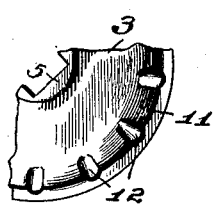
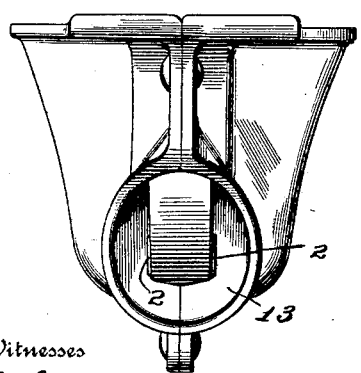

UNITED STATES PATENT OFFICE.

CHRIST MOEHRING AND WILLIAM FETZER, OF MIDDLETOWN, OHIO; SAID MOEHRING ASSIGNOR TO SAID FETZER.

SEEDER.

SPECIFICATION forming part of Letters Patent No. 700,966, dated May 27, 1902.

Application filed December 9, 1901. Serial No. 85,262. (No model.)

*To all whom it may concern:*

Be it known that we, CHRIST MOEHRING and WILLIAM FETZER, citizens of the United States, residing at Middletown, in the county of Butler and State of Ohio, have invented certain new and useful Improvements in Seeders; and we do hereby declare the following to be a full, clear, and exact description of the invention, such as will enable others skilled in the art to which it appertains to make and use the same.

Our invention relates to improvements in seeding-machines, and particularly refers to the mechanism for dropping or distributing the seed by means of a forced feed.

It consists in a seed-dropping mechanism comprising a seed-cup having a discharge throat or outlet leading therefrom, the wall of the seed-cup immediately above the entrance to said discharge-outlet receding considerably, so as to prevent any crowding or crushing action upon the seeds in the cup.

It consists also in a seed-cup formed with a discharge-outlet, a seed-wheel for removing seed from the cup, the said cup being formed with an enlarged or bulged portion just above the outlet-passage, whereby the seed in the cup will have ample room to move about under the action of the seeding-wheel without any chance of crowding or crushing the seed.

The invention also consists in a seed-distributing device comprising a cup formed with an outlet-passage, a guarding projection extending slightly into the entrance of said outlet, so that seed which pass said guarding projection will be perfectly free to pass out through the throat or outlet-passage.

It further consists in certain other novel constructions, combinations, and arrangement of parts, as will be hereinafter fully described and claimed.

In the accompanying drawings, forming part of this application, Figure 1 represents a perspective view of one side of a double seed-cup constructed in accordance with the present invention looking at the same from the inside. Fig. 2 is a transverse vertical section through such a seed-cup. Fig. 3 is a rear elevation of the same, showing the flaring delivery tube or mouth for the seed-cup. Fig. 4 is a detail fragmentary view of a portion of the seed-wheel, showing the seed-engaging grooves arranged near its periphery; and Fig. 5 is a side elevation of one-half of the seed-cup looking at same from the inside.

In using seeders of a similar character to that which forms the subject-matter of the present invention difficulty has been found heretofore in preventing the seed from being crushed at the entrance of the outlet-throat as the seed-wheel is forced around in its revolution. This has resulted principally because of the formation of the seed-cup and the outlet throat or passage-way as they have been heretofore constructed. There has also been a tendency in previous devices of this character to a clogging of the seed within the funnel of the seed-cup.

The present invention is designed to obviate these difficulties, as well as produce a more perfect seed-distributing device in other respects. The invention may be applied to single seed-cups—that is, cups that are formed with only one outlet and are adapted to handle only one size of seed; but the said invention is preferably applied to double seed-cups adapted to handle seeds of different kinds and sizes, and we have therefore illustrated our invention by showing in the drawings a double seed-cup.

Referring now to the drawings, the seed-cup 1 is formed with a flaring seed-receptacle which is provided at its lower end with an outlet throat or passage-way 2, through which the seeds are delivered. The upper part of the seed-cup 1 is constructed in any well-known or usual manner, so as to be adapted to fit upon the lower edges of the seed-containing hopper of a seeding-machine. The seed-cup 1 is, when made in the double form, as illustrated preferably formed of two half-castings applied together around a seeding-wheel 3, the castings then being permanently secured together by riveting or other suitable means. The cup is formed with an annular recess, as at 4, for accommodating the seed-wheel 3, the periphery of the said wheel also traveling through the throat or delivery-passage 2 of the seed-cup. The seed-wheel 3 is formed with a central hub, as at 5, which projects into a central opening 6, formed in the seed-cup. The hub 5 of the seed-wheel is also apertured centrally and preferably squared to fit upon the usual square driving-shaft, which passes through the seed-cups of a seeding-machine.

The construction of the bottom of the seed-receptacle in the cup forms an important feature of the invention. By reference to Fig. 1 of the drawings it will be seen that the outlet passage or throat 2 leaves the seed-receptacle at the lower end thereof, so that the seed can easily drop into said throat. The rear wall of the seed-cup immediately above the throat-opening is concaved, as at 7, to a considerable degree, as clearly shown in Figs. 1 and 5, so that any seed which do not drop into the outlet-passage will not be held or jammed tightly against the rear wall of the seed-cup, but will freely travel up the receding curved surface 7 of said rear wall. We find in practice that this structure prevents any possibility of the crowding and consequent crushing of the seed above the outlet-opening. The lower portion of the seed-cup is also bulged and well rounded out laterally, so there is ample room in the bottom of the cup for all the seed contained therein. As a result of this structure as the seed-wheel 3 revolves within the seed-cup the seed in the lower reduced portion of the cup are constantly kept in motion, there being nothing to hold or clog them in any way.

The entrance to the outlet-throat 2 is preferably guarded by a projection 8, which extends slightly into the throat of the opening, making the said opening a little smaller at this point than at any other point, so that seed which pass said projection cannot become clogged, but are permitted to pass easily through the discharge-passage. The guarding projection 8 selects the seed which are to pass out through the discharge-opening, and those which fail to enter the opening for the time being are directed by the said projection to the receding curved wall 7 of the seed-cup and are further churned in the lower end of the said seed-cup until their turn arrives to pass out through the throat. The outlet-passage 2 follows the periphery of the seed-wheel 3 and is preferably slightly flared from its inner end outwardly, so that instead of the seed becoming clogged therein they become more loose and free in their movement. The lower wall of the passage-way 2 is preferably made to fit snugly upon the outer periphery of the seed-wheel 3; but the upper wall of the said passage-way instead of being angular, as heretofore manufactured, is rounded or curved, as at 9, so that the seed have no chance to become clogged, as in the case of the angular passage-ways heretofore employed. Opposing the curved upper wall 9 of the discharge-passage 2 is the peripheral flange 10 of the seed-wheel. As seen in Figs. 2 and 4 of the drawings, we preferably join the edges of these flanges on the seed-wheel with the central web portion of the wheel by a curved surface, as at 11, the structure being such that seed passing out through the passage-way 2 will travel between the curved surfaces 9 and 11. In a device such as that illustrated in the drawings, showing a double seed-cup, a seed-wheel 3 is used having a flange 10 extending laterally in each direction from the web of the wheel, one flange, however, being slightly wider than the other, since it is to handle larger seed and is to fill a correspondingly-larger recess in the discharge passage-way of the side of the seed-cup which handles large seed. We preferably provide the inner surface of the wheel-flanges 10 with a series of depressions or grooves 12, which extend radially from the edge of said flanges to the web of the wheel in the curved surface 11. These grooves serve to engage the seed and carry the same from the seed-cup through the delivery-passage.

The seed which pass through the passage-way 2 may be dropped immediately from the seed-cup at the outlet thereof; but we preferably use a flaring delivery-spout, as 13, formed upon the cup, so as to surround the outlet passage or passages 2 of the said cup. This flaring delivery-spout 13 serves to drop the seed in an improved manner from the seed-cup and prevents too many seed being deposited close together in the ground. The flaring spout 13 may be made separate from the seed-cup, if desired, and attached thereto in any suitable manner; but we preferably form the same integral with the seed-cup proper, as illustrated in the drawings.

As above intimated, of course the invention can be as easily applied to a single seed-cup as to a double one, or in applying the invention to a double seed-cup the seed-wheel and delivery-passages can be made both of the same size, if desired, for handling seed of the same size in both sides of the cup.

By practical demonstration with seed-cups constructed as above described we find that seed which do not enter the mouth of the discharge-passage 2 as the seed-wheel revolves cannot be caught at the entrance to said passage-way, but are free to glide along the receding curved wall 7 of the seed-cup, and by the use of a widened bulged portion at the lower end of the seed-receptacle all the seed at the bottom of the cup are kept in continual motion as the seed-wheel operates, there being no lodging or catching projection for any of them. As a result the seed pass easily and smoothly from the seed-cup and without the chance of any of them being crushed. After the seed pass the guarding projection 8 at the entrance of the discharge-passage they easily and freely pass through such passage and out into the discharge-spout.

Having fully described our invention, what we claim as new, and desire to secure by Letters Patent of the United States, is—

1. A seeding mechanism, comprising a seed-cup, having a discharge-passage leading therefrom, the wall of the said cup which is immediately above the entrance of the outlet-passage extending outwardly over the said passage so that seed which do not enter the passage cannot be caught and crushed but are free to yield and move along the receding wall above the passage-entrance, substantially as described.

2. A seeding device, comprising a seed-cup having a discharge-passage leading therefrom, a guarding projection extending slightly into said passage at the entrance thereof, so that seed which are able to pass the said projection will easily travel through the said passage-way without danger of clogging, substantially as described.

3. A seeding mechanism, comprising a seed-cup having an outlet or discharge passage leading therefrom, means for carrying seed from the cup through said passage, the said passage-way increasing slightly in size from its inner end outwardly so that seed which once enter said passage have no chance of clogging therein, substantially as described.

4. A seeding device, comprising a cup having a discharge outlet-passage leading therefrom, a seed-wheel for carrying seed through said passage, the wall of said passage which opposes said wheel being rounded to prevent the possibility of seed being caught therein, substantially as described.

5. A seeding device, comprising a seed-cup having an outlet-passage leading from the lower end thereof, the said cup being enlarged in a semispherical manner above the entrance of said discharge-passage, and a seed-wheel for carrying the seed from the cup, the bulged portion of the cup preventing any clogging of the seed and causing them to be thoroughly churned therein by the action of the seed-wheel, substantially as described.

6. A seeding device, comprising a seed-cup, an outlet-passage leading therefrom, a seeding-wheel journaled within the cup and formed with a flange having a curved inner seed-engaging surface, the said flange being provided with means for engaging the seed and carrying the same through the discharge-passage of the cup, substantially as described.

7. A seeding device, comprising a seed-cup formed with outlet-passages leading therefrom, the said passages having curved inner surfaces, a seeding-wheel arranged so that its periphery will travel through said passages, the said seeding-wheel being formed with laterally-extending peripheral flanges formed with curved inner surfaces opposing the curved inner surfaces of the discharge-passages, the said seed-wheel flanges being formed with a series of radially-arranged grooves or depressions in their curved surfaces for engaging the seed more positively, substantially as described.

8. A seeding device, comprising a seed-cup formed with an enlarged portion at its lower end having a curved inner surface, a discharge passage-way leading from said enlarged portion, a guarding projection at the entrance of the passage-way arranged to divide the seed, permitting some to pass into the passage-way and others to travel around upon the inner curved surfaces of the enlarged portion of said cup, and a seed-wheel for continually agitating the seed in the cup and carrying them out through the discharge passage-way, substantially as described.

In testimony whereof we hereunto affix our signatures in presence of two witnesses.

CHRIST MOEHRING.
WILLIAM FETZER.

Witnesses:
W. D. VORHIS,
E. PAULIN.